United States Patent [19]
Cone et al.

[11] Patent Number: 6,126,018
[45] Date of Patent: Oct. 3, 2000

[54] GREASE STRAINING AND COLLECTING DEVICE

[76] Inventors: John W. Cone; Lauren E. Cone, both of 214 Pebble Brook, Grain Valley, Mo. 64029

[21] Appl. No.: 09/397,258

[22] Filed: Sep. 16, 1999

[51] Int. Cl.[7] .................................................. B01D 24/00
[52] U.S. Cl. ............................................ 210/469; 210/474
[58] Field of Search ......................... 220/23.89; 210/244, 210/466, 464, 479, 469, 474

[56] References Cited

U.S. PATENT DOCUMENTS

| | | |
|---|---|---|
| D. 105,367 | 7/1937 | Swordling . |
| D. 327,609 | 7/1992 | Carlson . |
| 2,106,453 | 1/1938 | Ekdahl . |
| 2,582,801 | 1/1952 | Steen .................................... 126/378 |
| 2,820,446 | 1/1958 | Freeman ............................. 126/25 R |
| 4,555,339 | 11/1985 | Graves et al. ......................... 210/244 |
| 4,938,375 | 7/1990 | Fantacone . |
| 5,139,166 | 8/1992 | Smith . |
| 5,322,196 | 6/1994 | Burton . |

Primary Examiner—Bryon P. Gehman
Assistant Examiner—Troy Arnold

[57] ABSTRACT

A grease straining and collecting device for straining and collecting grease from cooked meat, including cooked ground beef. The grease straining and collecting device includes a bowl-shaped strainer for holding cooked meat therein. The strainer has a plurality of spaced apart holes therethrough to permit straining of grease from the meat out of the strainer. The strainer has a bottom and a perimeter side with an upper edge defining an open top of the strainer. The strainer has an outwardly radiating outer lip around the upper edge of the strainer. A collecting container is also included having a bottom wall and a perimeter side wall upwardly extending around the bottom wall of the collecting container. The perimeter side wall of the collecting container has an upper rim defining an open top of the collecting container. The strainer is inserted into the open top of the collecting container so that the outer lip of the strainer rests on the upper rim of the perimeter side wall of sad collecting container. The perimeter side wall of the collection container has a spout.

9 Claims, 2 Drawing Sheets

GREASE STRAINING AND COLLECTING DEVICE

BACKGROUND OF THE INVENTION

1. Field of the Invention

The present invention relates to grease straining and collecting devices and more particularly pertains to a new grease straining and collecting device for straining and collecting grease from cooked meat, including cooked ground beef.

2. Description of the Prior Art

The use of grease straining and collecting devices is known in the prior art. More specifically, grease straining and collecting devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. Des. 327,609; U.S. Pat. Nos. 4,938,375; 5,139,166; 2,106,453; 5,322,196; and U.S. Pat. No. Des. 105,367.

While these devices fulfill their respective, particular objectives and requirements, the aforementioned patents do not disclose a new grease straining and collecting device. The inventive device includes a bowl-shaped strainer for holding cooked meat therein. The strainer has a plurality of spaced apart holes therethrough to permit straining of grease from the meat out of the strainer. The strainer has a bottom and a perimeter side with an upper edge defining an open top of the strainer. The strainer has an outwardly radiating outer lip around the upper edge of the strainer. A collecting container is also included having a bottom wall and a perimeter side wall upwardly extending around the bottom wall of the collecting container. The perimeter side wall of the collecting container has an upper rim defining an open top of the collecting container. The strainer is inserted into the open top of the collecting container so that the outer lip of the strainer rests on the upper rim of the perimeter side wall of sad collecting container. The perimeter side wall of the collection container has a spout.

In these respects, the grease straining and collecting device according to the present invention substantially departs from the conventional concepts and designs of the prior art, and in so doing provides an apparatus primarily developed for the purpose of straining and collecting grease from cooked meat, including cooked ground beef.

SUMMARY OF THE INVENTION

In view of the foregoing disadvantages inherent in the known types of grease straining and collecting devices now present in the prior art, the present invention provides a new grease straining and collecting device construction wherein the same can be utilized for straining and collecting grease from cooked meat, including cooked ground beef.

The general purpose of the present invention, which will be described subsequently in greater detail, is to provide a new grease straining and collecting device apparatus and method which has many of the advantages of the grease straining and collecting devices mentioned heretofore and many novel features that result in a new grease straining and collecting device which is not anticipated, rendered obvious, suggested, or even implied by any of the prior art grease straining and collecting devices, either alone or in any combination thereof.

To attain this, the present invention generally comprises a bowl-shaped strainer for holding cooked meat therein. The strainer has a plurality of spaced apart holes therethrough to permit straining of grease from the meat out of the strainer. The strainer has a bottom and a perimeter side with an upper edge defining an open top of the strainer. The strainer has an outwardly radiating outer lip around the upper edge of the strainer. A collecting container is also included having a bottom wall and a perimeter side wall upwardly extending around the bottom wall of the collecting container. The perimeter side wall of the collecting container has an upper rim defining an open top of the collecting container. The strainer is inserted into the open top of the collecting container so that the outer lip of the strainer rests on the upper rim of the perimeter side wall of sad collecting container. The perimeter side wall of the collection container has a spout.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be to utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new grease straining and collecting device apparatus and method which has many of the advantages of the grease straining and collecting devices mentioned heretofore and many novel features that result in a new grease straining and collecting device which is not anticipated, rendered obvious, suggested, or even implied by any of the prior art grease straining and collecting devices, either alone or in any combination thereof.

It is another object of the present invention to provide a new grease straining and collecting device which may be easily and efficiently manufactured and marketed.

It is a further object of the present invention to provide a new grease straining and collecting device which is of a durable and reliable construction.

An even further object of the present invention is to provide a new grease straining and collecting device which is susceptible of a low cost of manufacture with regard to both materials and labor, and which accordingly is then susceptible of low prices of sale to the consuming public, thereby making such grease straining and collecting device economically available to the buying public.

Still yet another object of the present invention is to provide a new grease straining and collecting device which provides in the apparatuses and methods of the prior art some of the advantages thereof, while simultaneously overcoming some of the disadvantages normally associated therewith.

Still another object of the present invention is to provide a new grease straining and collecting device for straining and collecting grease from cooked meat, including cooked ground beef.

Yet another object of the present invention is to provide a new grease straining and collecting device which includes a bowl-shaped strainer for holding cooked meat therein. The strainer has a plurality of spaced apart holes therethrough to permit straining of grease from the meat out of the strainer. The strainer has a bottom and a perimeter side with an upper edge defining an open top of the strainer. The strainer has an outwardly radiating outer lip around the upper edge of the strainer. A collecting container is also included having a bottom wall and a perimeter side wall upwardly extending around the bottom wall of the collecting container. The perimeter side wall of the collecting container has an upper rim defining an open top of the collecting container. The strainer is inserted into the open top of the collecting container so that the outer lip of the strainer rests on the upper rim of the perimeter side wall of sad collecting container. The perimeter side wall of the collection container has a spout.

Still yet another object of the present invention is to provide a new grease straining and collecting device that has a collection container with a spout to permit dripless pouring of the collected grease out of the collection container during disposal of the collected grease.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
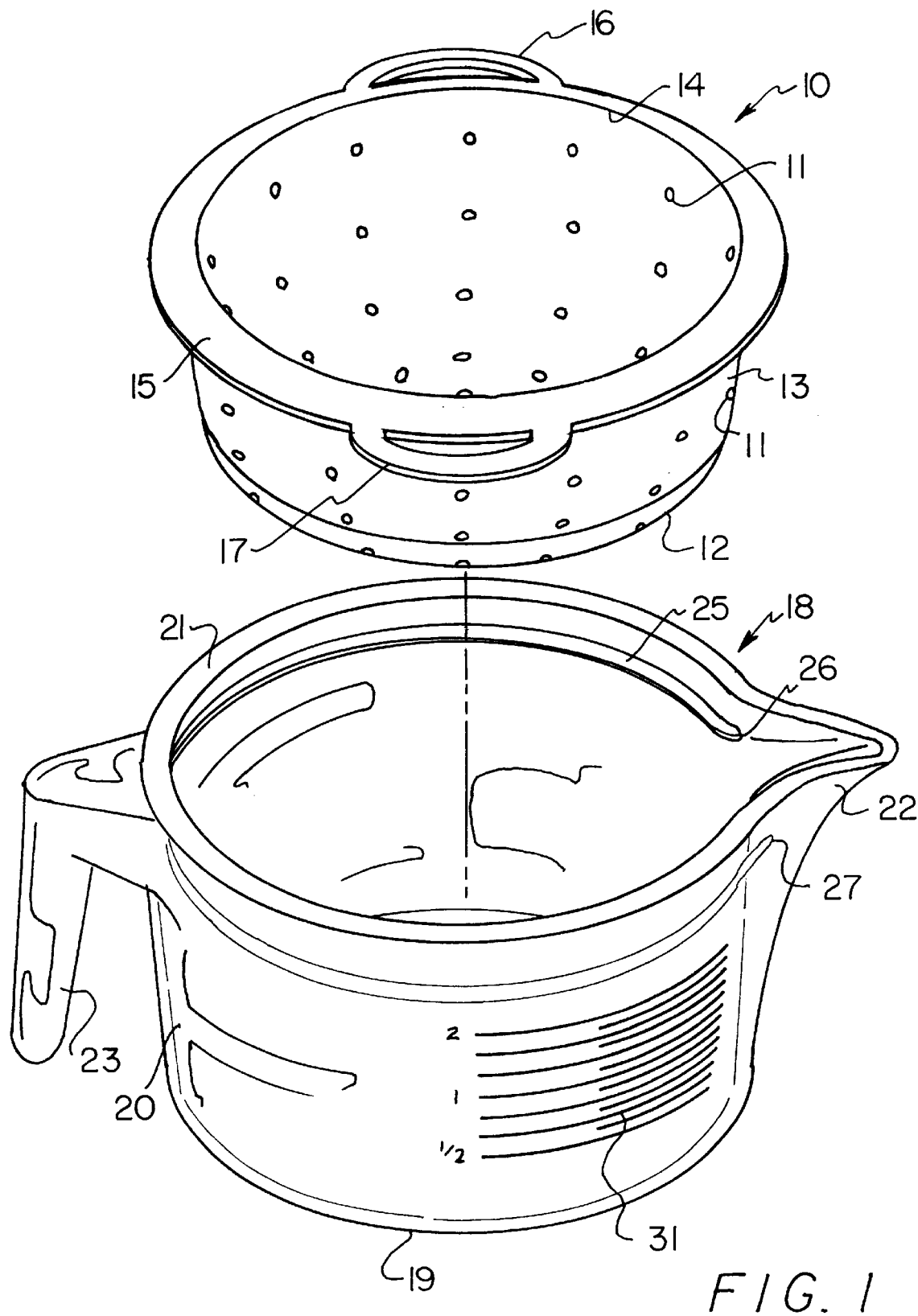
FIG. 1 is a schematic exploded perspective view of a new grease straining and collecting device according to the present invention.
Figure 2:
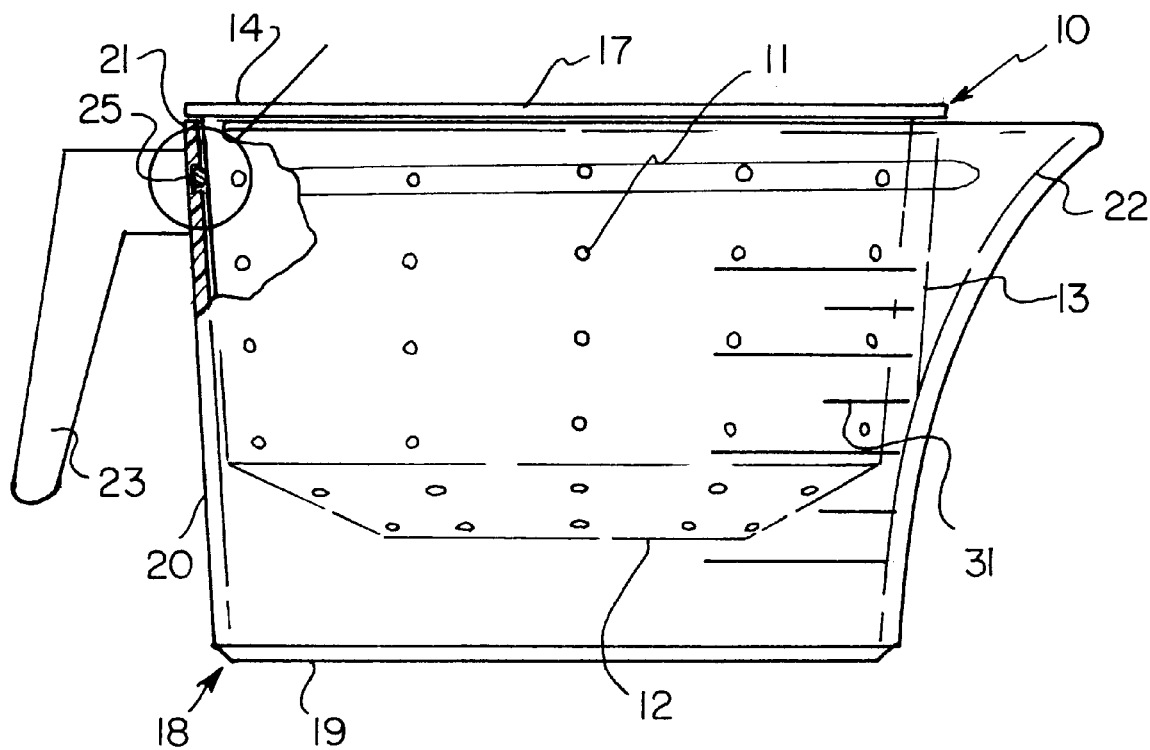
FIG. 2 is a schematic partial breakaway side view of the present invention.
Figure 3:
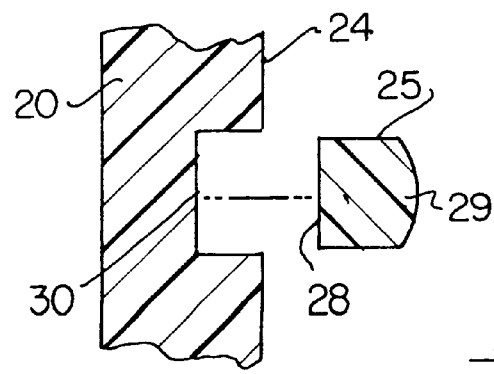
FIG. 3 is a schematic enlarged exploded view taken from the circle 3 of FIG. 2.

With reference now to the drawings, and in particular to FIGS. 1 through 3 thereof, a new grease straining and collecting device embodying the principles and concepts of the present invention will be described.

As best illustrated in FIGS. 1 through 3, the grease straining and collecting device generally comprises a bowl-shaped strainer for holding cooked meat therein. The strainer has a plurality of spaced apart holes therethrough to permit straining of grease from the meat out of the strainer. The strainer has a bottom and a perimeter side with an upper edge defining an open top of the strainer. The strainer has an outwardly radiating outer lip around the upper edge of the strainer. A collecting container is also included having a bottom wall and a perimeter side wall upwardly extending around the bottom wall of the collecting container. The perimeter side wall of the collecting container has an upper rim defining an open top of the collecting container. The strainer is inserted into the open top of the collecting container so that the outer lip of the strainer rests on the upper rim of the perimeter side wall of sad collecting container. The perimeter side wall of the collection container has a spout.

In use, the device is designed for straining and collecting grease from cooked meat. Specifically, the device include a bowl-shaped strainer 10 for holding cooked meat such as cooked ground beef therein. The strainer has a plurality of spaced apart generally circular holes 11 therethrough to permit straining of grease from the meat out of the bowl. The strainer has a bottom 12 and a perimeter side 13. The perimeter side has an upper edge 14 defining an open top of the strainer. The perimeter side of the strainer may be generally cylindrical in shape.

The holes of the strainer are located in the bottom and the perimeter side of the strainer. The holes of the strainer may be arranged in a plurality of radial rows extending between the upper edge of the perimeter side of the strainer and a center of the bottom of the strainer. This arrangement of the holes helps insure that the cooked meat in the strainer has as much of grease as possible drained away.

The strainer has an outwardly radiating annular outer lip 15 around the upper edge of the strainer. The strainer may also have a pair of handles 16,17 coupled to the outer lip of the strainer for permitting easy lifting of the strainer especially when hot cooked meat is in the strainer. The handles may be diametrically positioned apart from one another along an outer diameter of the outer lip of the strainer. The handles and the outer lip of the strainer may also lie in a common plane with one another.

The device also includes a collecting container 18 having a bottom wall 19 and a perimeter side wall 20 upwardly extending around the bottom wall of the collecting container. The perimeter side wall of the collecting container has an upper rim 21 defining an open top of the collecting container. The perimeter side wall of the collecting container may be generally cylindrical in shape.

The strainer is inserted into the open top of the collecting container so that the outer lip of the strainer rests on the upper rim of the perimeter side wall of sad collecting container. The handles of the strainer outwardly extend away from the perimeter side wall of the collecting container. In one embodiment, the bottom of the strainer may be spaced above the bottom wall of the collection container when the strainer is inserted into the collecting container to provide a space in the collecting container below the strainer for collecting grease strained through the strainer without the collected grease touching the bottom of the strainer.

The perimeter side wall of the collection container has a spout 22 defining a generally V-shaped region of the upper rim of the perimeter side wall of the collection container. The V-shaped region of the upper rim is exposed when the strainer is inserted into the collection container. In use, the spout is designed for permitting pouring of the collected grease out of the collecting container to dispose of the collected grease with minimal dripping of the grease down the side of the collecting container.

The collecting container may also have a generally inverted L-shaped pour handle 23 coupled to the perimeter side wall of the collecting container. The pour handle may be located on the perimeter side wall of the collecting container diametrically opposite the spout.

The perimeter side wall has an inner surface 24 facing into the collecting container. In one embodiment, an annular portion of an outer surface of the perimeter side of the strainer frictionally engages an annular portion of the inner surface of the perimeter side wall of the collection container located adjacent the upper rim of the perimeter side wall of the collection container to frictionally hold the strainer in the collection container when the outer lid of the strainer rests on the upper rim of the perimeter side wall of the collection container.

Optionally, the collecting container may have an inwardly extending generally C-shaped resiliently deformable retaining ridge 25 along the inner surface of the perimeter side wall of the collecting container. The retaining ridge has a pair of opposing ends 26,27 defining a break. The spout is positioned adjacent the break of the retaining ridge. In such an embodiment, the outer surface of the perimeter side of the strainer abuts the retaining ridge such that the retaining ridge frictionally engages the outer surface of the perimeter side of the strainer to frictionally hold the strainer in the collecting container.

With reference to FIG. 3, the retaining ridge may have a generally D-shaped transverse cross section defining a flat inner portion 28 and an arcuate outer portion 29. The outer portion of the retaining ridge is extended away from the inner surface of the perimeter side wall into the collecting container. The inner surface of the perimeter side wall may have a generally C-shaped channel 30 therein with a break located adjacent the spout. In such an embodiment, the inner portion of the retaining ridge is inserted into the channel such that the outer portion faces outwards from the channel. The channel may have a generally rectangular U-shaped transverse cross section.

The collecting container may comprise a translucent and/or a transparent material and may also include measuring indicia 31 displayed on the perimeter side wall for indicating the volume of grease collected therein.

In use, the strainer is inserted into the collecting container as described above. Cooked meat is then placed in the strainer and left to let grease from the meat drain through the holes of the strainer into the collecting container. Once the grease is collected, it may be disposed of by pouring out of the collecting container via the spout thereby minimizing the amount of grease that may drip down the perimeter side wall of the collecting container as the grease is poured out.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A device for straining and collecting grease from cooked meat, said device comprising:

a bowl-shaped strainer for holding cooked meat therein;

said strainer having a plurality of spaced apart holes therethrough to permit straining of grease from said meat out of said strainer;

said strainer having a bottom and a perimeter side, said perimeter side having an upper edge defining an open top of said strainer;

said strainer having an outwardly radiating outer lip around said upper edge of said strainer;

a collecting container having a bottom wall and a perimeter side wall upwardly extending around said bottom wall of said collecting container;

said perimeter side wall of said collecting container having an upper rim defining an open top of said collecting container;

said strainer being inserted into said open top of said collecting container, said outer lip of said strainer resting on said upper rim of said perimeter side wall of sad collecting container;

said perimeter side wall of said collection container having a spout;

wherein said perimeter side wall has an inner surface facing into said collecting container, wherein an annular portion of an outer surface of said perimeter side of said strainer frictionally engages an annular portion of said inner surface of said perimeter side wall of said collection container located adjacent said upper rim of said perimeter side wall of said collection container to frictionally hold said strainer in said collection container when said outer lid of said strainer rests on said upper rim of said perimeter side wall of said collection container; and wherein said collecting container has an inwardly extending generally C-shaped resiliently deformable retaining ridge along said inner surface of said perimeter side wall of said collecting container, said retaining ridge having a pair of opposing ends defining a break, said spout being positioned adjacent said break of said retaining ridge such that the strained grease may be poured freely without contacting said strainer, said outer surface of said perimeter side of said strainer abutting said retaining ridge such that said retaining ridge frictionally engages said outer surface of said perimeter side of said strainer to frictionally hold said strainer in said collecting container.

2. The device of claim 1, wherein said holes of said strainer are located in said bottom and said perimeter side of said strainer.

3. The device of claim 2, wherein said holes of said strainer are arranged in a plurality of radial rows extending between said upper edge of said perimeter side of said strainer and a center of said bottom of said strainer.

4. The device of claim 1, wherein said strainer has a pair of handles coupled to said outer lip of said strainer.

5. The device of claim 4, wherein said handles are diametrically positioned apart from one another along an outer diameter of said outer lip of said strainer.

6. The device of claim 5, wherein said handles and said outer lip of said strainer lie in a common plane with one another.

7. The device of claim 1, wherein said bottom of said strainer is spaced above said bottom wall of said collection container.

8. The device of claim 1, wherein said collecting container has a pour handle coupled to said perimeter side wall of said collecting container.

9. A device for straining and collecting grease from cooked meat, said device comprising:

a bowl-shaped strainer for holding cooked meat therein;

said strainer having a plurality of spaced apart generally circular holes therethrough to permit straining of grease from said meat out of said bowl;

said strainer having a bottom and a perimeter side, said perimeter side having an upper edge defining an open top of said strainer;

said perimeter side of said strainer being generally cylindrical in shape;

said holes of said strainer being located in said bottom and said perimeter side of said strainer;

said holes of said strainer being arranged in a plurality of radial rows extending between said upper edge of said perimeter side of said strainer and a center of said bottom of said strainer;

said strainer having an outwardly radiating annular outer lip around said upper edge of said strainer;

said strainer having a pair of handles coupled to said outer lip of said strainer for permitting easy lifting of said strainer;

said handles being diametrically positioned apart from one another along an outer diameter of said outer lip of said strainer;

said handles and said outer lip of said strainer lying in a common plane with one another;

a collecting container having a bottom wall and a perimeter side wall upwardly extending around said bottom wall of said collecting container;

said perimeter side wall of said collecting container having an upper rim defining an open top of said collecting container;

said perimeter side wall of said collecting container being generally cylindrical in shape;

said strainer being inserted into said open top of said collecting container, said outer lip of said strainer resting on said upper rim of said perimeter side wall of sad collecting container;

said handles of said strainer outwardly extending away from said perimeter side wall of said collecting container;

said bottom of said strainer being spaced above said bottom wall of said collection container when said strainer is inserted into said collecting container to provide a space in said collecting container below said strainer for collecting grease strained through said strainer without the collected grease touching said bottom of said strainer;

said perimeter side wall of said collection container having a spout defining a generally V-shaped region of said upper rim of said perimeter side wall of said collection container, said V-shaped region of said upper rim being exposed when said strainer is inserted into said collection container;

said spout being adapted for permitting pouring of the collected grease out of said collecting container for facilitating disposal of the collected grease;

said collecting container having a pour handle coupled to said perimeter side wall of said collecting container;

said pour handle being located on said perimeter side wall of said collecting container diametrically opposite said spout;

said perimeter side wall having an inner surface facing into said collecting container;

wherein an annular portion of an outer surface of said perimeter side of said strainer frictionally engages an annular portion of said inner surface of said perimeter side wall of said collection container located adjacent said upper rim of said perimeter side wall of said collection container to frictionally hold said strainer in said collection container when said outer lid of said strainer rests on said upper rim of said perimeter side wall of said collection container;

said collecting container having an inwardly extending generally C-shaped resiliently deformable retaining ridge along said inner surface of said perimeter side wall of said collecting container;

said retaining ridge having a pair of opposing ends defining a break, said spout being positioned adjacent said break of said retaining ridge such that the strained grease may be poured freely without contacting said strainer;

said outer surface of said perimeter side of said strainer abutting said retaining ridge such that said retaining ridge frictionally engages said outer surface of said perimeter side of said strainer to frictionally hold said strainer in said collecting container.

* * * * *